United States Patent Office 3,298,843
Patented Jan. 17, 1967

3,298,843
METHOD FOR THE PREPARATION OF CEMENT
Tadashi Asano, Tokyo, Japan, assignor to Onoda Cement Company, Limited, Onoda, Yamaguchi Prefecture, Japan
Filed Dec. 3, 1963, Ser. No. 327,608
Claims priority, application Japan, Dec. 13, 1962, 37/55,060
4 Claims. (Cl. 106—100)

This invention relates to a method for the preparation of cement by molding a cement raw mixture comprising calcium oxide and calcium carbonate as a calcium raw material in a specified ratio under pressure into molded articles and calcining said molded articles.

There has already been practised a method for the preparation of cement by calcining a cement raw mixture in powder state comprising lime stone or quick lime as a calcium raw material. And also it has been well known that the calcination of a cement raw mixture comprising substantially quick lime as a calcium raw material is more easily carried out as compared with that of a cement raw mixture comprising calcium carbonate as a calcium raw material.

However, when such a cement raw mixture is used for the preparation of cement, a considerable large amount of the raw mixture escapes into the flue from a cement kiln and is lost as dust. This causes difficulty in the preparation of cement having a desired composition and therefore the dust has been usually recovered by using a device such as an electric collector having a large capacity.

Also, there has been planned a method for the preparation of cement by compressing molding a cement raw mixture comprising calcium carbonate as a calcium raw material into molded articles and calcining said molded articles but the method has not been practised since such a raw cement mixture cannot be compressed easily and does not result in a high yield of molded articles.

Now the inventor has developed this invention in order to overcome the defects adherent to the prior art.

An object of this invention is to provide a method for the preparation of the molded articles with a high yield by molding a cement raw mixture comprising calcium oxide and calcium carbonate as a calcium raw material in the specified ratio as defined hereinafter.

Another object of this invention is to provide an economical method for the preparation of a high grade cement by calcining the molded articles in a kiln with a high thermal efficiency and reducing the amount of dust.

Other objects of this invention will be obvious from the detailed description hereinafter.

In accordance with this invention a method is comprised the steps of molding a cement raw mixture comprising quick lime and lime stone as a calcium raw material in the ratio of the calcium oxide to the calcium carbonate being above 45.4:54.6 into molded articles and calcining said molded articles. In accordance with one modification of this invention a cement raw mixture contains at least one binder as an additional component selected from the group consisting of water, alkaline earth metal hydroxides, mineral oils such as heavy oil, vegetable oils such as soybean oil, spent liquors from pulp making, natural and synthetic plastic materials.

Raw materials used in this invention were analyzed and the results were shown in the following Table 1 together with their particle sizes.

TABLE 1

| Items | 88μ Sieve Residue (Percent) | Chemical Components (Percent) | | | | | | |
|---|---|---|---|---|---|---|---|---|
| | | Ignition Loss | $SiO_2$ | $Al_2O_3$ | $Fe_2O_3$ | CaO | MgO | Total |
| Raw Materials: | | | | | | | | |
| Lime Stone | 2.0 | 42.6 | 2.5 | 0.4 | 0.1 | 53.7 | 0.6 | 99.9 |
| Lime (CaO) | 2.0 | 4.1 | 4.2 | 0.7 | 0.2 | 89.5 | 1.0 | 99.7 |
| Alumina | 0.9 | 8.8 | 59.3 | 19.0 | 8.1 | 0.8 | 3.0 | 99.0 |
| Silica | 0.9 | 2.2 | 89.8 | 5.0 | 1.7 | 0.5 | 0.8 | 100.0 |
| Copper Slag | 0.9 | | 34.7 | 8.4 | 43.8 | 11.2 | 2.4 | 100.5 |

The quick lime in the table was prepared by calcining lime-stone and it contained calcium carbonate in an amount of about 4.6% by weight of calcium oxide.

And the copper slag was a by-product from a copper refinery.

The cement raw mixtures of Nos. 1 to 11 as shown in Table 2 and having the chemical composition to meet the following Equations 1 to 3 were prepared by using the raw materials as shown in Table 1.

$$\frac{CaO(\%)}{SiO_2(\%)+Al_2O_3(\%)+Fe_2O_3(\%)}=2.13 \quad (1)$$

$$\frac{SiO_2(\%)}{Al_2O_3(\%)+Fe_2O_3(\%)}=2.8 \quad (2)$$

$$\frac{Al_2O_3(\%)}{Fe_2O_3(\%)}=1.4 \quad (3)$$

It should be noted that the cement raw mixture contains the calcium oxide and calcium carbonate in varied amounts as shown in the following Table 2.

TABLE 2

| Items | Mixing Ratios (Percent) | | | | |
|---|---|---|---|---|---|
| | $CaCO_3$ | CaO | Alumina | Silica | Copper Slag |
| Nos. of Cement Raw Mixture: | | | | | |
| 1 | 0 | 70.5 | 17.9 | 8.1 | 3.5 |
| 2 | 7.1 | 64.2 | 17.4 | 7.9 | 3.4 |
| 3 | 14.4 | 57.8 | 16.9 | 7.6 | 3.3 |
| 4 | 22.0 | 51.2 | 16.3 | 7.4 | 3.2 |
| 5 | 29.6 | 44.4 | 15.8 | 7.1 | 3.1 |
| 6 | 37.5 | 37.5 | 15.2 | 6.8 | 3.0 |
| 7 | 45.5 | 30.4 | 14.6 | 6.6 | 2.9 |
| 8 | 53.8 | 23.0 | 14.1 | 6.3 | 2.8 |
| 9 | 62.2 | 15.6 | 13.5 | 6.0 | 2.7 |
| 10 | 70.9 | 7.9 | 12.9 | 5.8 | 2.5 |
| 11 | 79.9 | 0 | 12.2 | 5.5 | 2.4 |

For a better understanding of the nature and objects as described above of this invention, reference should be had to the detailed explanation and an example hereinafter given in combination with the accompanying drawings in which.

The clinker illustrated in FIG. 1 was made as follows:

A raw mixture of cement was compressed between rollers under pressure of 100 kg./cm.$^2$ into a form of sheet and the sheet was cut into chips having a size as desired. Raw mixtures of cement including calcium oxide and calcium carbonate in proportions varying, as illustrated in FIG. 1, from 0% calcium oxide and 100% calcium carbonate to 100% calcium oxide and 0% calcium carbonate were employed. Five grams of the chip were charged into a platinum crucible. An electric furnace was heated at 1000° C. and then the platinum crucible was located in the electric furnace and the temperature of the electric furnace was raised to a temperature of 1450° C. for over one hour and maintained at that temperature for 15 minutes to produce clinker. The clinker was then cooled and analyzed in order to measure the content of free calcium oxide therein.

Figure 1:
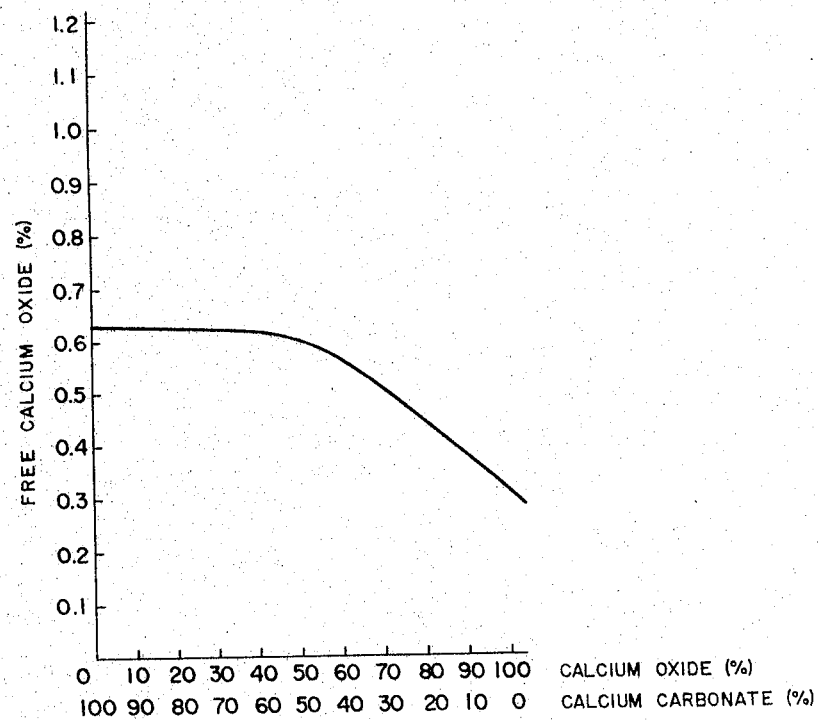
FIGURE 1 is a curve showing the relationship between a free calcium oxide contained in a clinker and the ratio of lime-stone to quick lime in the raw mixture.

As seen from FIGURE 1, the inventor found that the content of the free calcium oxide of the clinker is sharply decreased when the ratio of the calcium oxide to the calcium carbonate is above 45.4:54.6.

Figure 2:
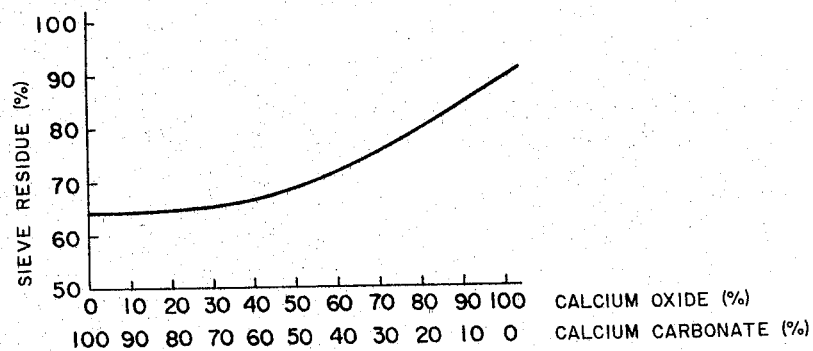
FIGURE 2 is a curve showing the relationship between molded articles retained on a 5 mm. sieve and a mixing ratio of lime-stone to quick lime.

Also, as seen from FIGURE 2, the inventor found that the sheet can not be formed with a high yield, as shown by the percent residue retained on the 5 mm. sieve, when the cement raw mixture is prepared by excluding the calcium oxide as the calcium raw material, but that the yield increases when the calcium oxide is used together with the calcium carbonate as the calcium raw material in the cement raw mixture, and particularly the yield is sharply increased when the cement raw mixture contains the quick lime and lime-stone as the calcium raw materials in a ratio of calcium oxide to calcium carbonate of above 35.4:64.6.

Further, in another modified embodiment of this invention, the cement raw mixture can be prepared under a reduced atmospheric pressure and the molding can easily be carried out as compared with the normal conventional operation due to the absence of air contained therein.

As illustrated above, this invention has the advantages that a high grade cement can be produced with the smoothness of calcination, a high thermal efficiency and the reduction of an amount of dust.

This invention is illustrated by the following example.

The lime as shown in Table 1 was crushed to the powdered particles having a 20% retained on the 88μ sieve. Alumina, silica and copper slag were mixed together in the ratio of alumina, silica and copper slag being 60.7:27.4:11.9 respectively and then the mixture was crushed to powdered particles having a 0.9% retained on the 88μ sieve. A cement raw mixture was prepared by mixing the former powder of calcium oxide and the latter powdered mixture in a ratio by weight of the former to the latter being 70.5 to 29.5.

Three kinds of clinker were prepared by using the resulted cement raw mixture as follows:

In the first case the cement raw mixture was compressed between rollers under pressure of 100 kg./cm.$^2$ into a sheet having a thickness of about 15 mm. and the sheet was charged into a pilot rotary kiln having a size of 800 mm. diameter and 8000 mm. length at a rate of 240 kg./hr. and calcined at a temperature of 1450° C. to produce a clinker.

In the second case, the same cement raw mixture was mixed with a lignin spent liquor (sp. gr.=1.25) in an amount of 6% by weight of said raw mixture and then the mixture was subjected to the compression and the calcination in the same manner as in the first case.

In the third case, the same cement raw mixture was directly charged into the same pilot rotary kiln as in the first case at a rate 182 kg./hr. and calcined in the same manner as in the first case.

The results are shown in the following table.

TABLE 3

| Kinds of Charge | Binder | Rate of Charge (kg./hr.) | Output (kg./hr.) | Calcination Temperature (° C.) | Total Thermal Consumption in (10$^3$ kcal./ clinker ton) | Free CaO Contained in Clinker (percent) | Dust Recovered (kg./clinker ton) |
|---|---|---|---|---|---|---|---|
| Compressed | | 240 | 212 | 1,450 | 2,940 | 0.23 | 47 |
| Do | Lignin Spent Liquor | 240 | 212 | 1,450 | 3,020 | 0.24 | 42 |
| Powdered | | 182 | 152 | 1,450 | 3,610 | 0.25 | 105 |

In accordance with this invention it should be understood that the lime as shown in Table 1 is substituted by any lime regardless of its content of calcium carbonate and therefore any calcium oxide can be used together with calcium carbonate so far as the ratio of the calcium oxide to the calcium carbonate is above 45.4:54.6 as mentioned above.

The cement raw mixtures are compressed under pressure above 50 kg./cm.$^2$ to obtain molded articles which do not disintegrate during handling.

However, in one modified embodiment of this invention, the compression can be lowered to below 50 kg./cm.$^2$ when the binders as described hereinbefore are added to the cement raw mixture as they give an excellent hardness to the molded articles. In addition, they provide certain advantages that the calcination of the molded articles can be carried out with smoothness as compared with a cement raw mixture not containing said binder, and with a reduction in the amount of the kiln dust. The binders should be used in an amount of below 6% by weight of the cement raw mixture because their excessive amount tends to disintegrate the molded articles.

What I claim is:

1. A method for the preparation of cement which comprises preparing a powdered raw cement mixture including as calcium raw materials calcium oxide and calcium carbonate, the ratio by weight of said calcium oxide to said calcium carbonate being above 45.4:54.6, compressing said raw cement mixture as a powder into molded articles and calcining said compressed article.

2. A method for the preparation of cement according to claim 1 wherein said powdered raw cement mixture is compressed at a pressure above 50 kg./cm.

3. A method for the preparation of cement which comprises preparing a powdered raw cement mixture including as calcium raw materials calcium oxide and calcium carbonate, the ratio by weight of said calcium oxide to said calcium carbonate being above 45.4:54.6, and including at least one binder, compressing said raw cement mixture as a powder into molded articles, and calcining said compressed articles.

4. The method according to claim 3, wherein at least one binder selected from the group consisting of water, alkaline earth metal hydroxides, mineral oils, vegetable oils, spent liquors from pulp making, natural and synthetic plastic materials is used in an amount of below 6% by weight of the cement raw mixture.

References Cited by the Examiner
UNITED STATES PATENTS
2,860,061  11/1958  Heilmann _____ 106—100

FOREIGN PATENTS
1,884  1/1884  Great Britain.

OTHER REFERENCES

The Chemistry of Cement and Concrete, Lea and Desch, Edward Arnold Ltd., London, 2nd edition, 1956, pp. 128, 129.

HELEN M. McCARTHY, *Acting Primary Examiner.*
TOBIAS E. LEVOW, *Examiner.*
S. E. MOTT, *Assistant Examiner.*